United States Patent
Ruiz et al.

(10) Patent No.: US 11,038,960 B1
(45) Date of Patent: Jun. 15, 2021

(54) STREAM-BASED SHARED STORAGE SYSTEM

(71) Applicant: Amazon Technologies, Inc., Seattle, WA (US)

(72) Inventors: Michael Joseph Ruiz, Bainbridge Island, WA (US); David Ricardo Rocamora, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 530 days.

(21) Appl. No.: 14/918,399

(22) Filed: Oct. 20, 2015

(51) Int. Cl.
  *H04L 29/08* (2006.01)
  *G06F 11/07* (2006.01)

(52) U.S. Cl.
  CPC ...... *H04L 67/1097* (2013.01); *G06F 11/0709* (2013.01); *G06F 11/0751* (2013.01); *H04L 67/1095* (2013.01); *H04L 67/32* (2013.01)

(58) Field of Classification Search
  CPC ........ G06F 17/30345–30377; G06F 17/30575; H04L 67/1097; H04L 67/1095
  USPC ........................................................ 709/219
  See application file for complete search history.

(56) References Cited

U.S. PATENT DOCUMENTS

| | | | |
|---|---|---|---|
| 5,918,229 A | 6/1999 | Davis et al. | |
| 6,697,846 B1 | 2/2004 | Soltis | |
| 8,495,625 B1 | 7/2013 | Sanders | |
| 8,601,308 B2 | 12/2013 | Peters et al. | |
| 8,601,473 B1 | 12/2013 | Aron et al. | |
| 2011/0010347 A1* | 1/2011 | Cheriton | G11C 15/00 707/692 |
| 2013/0181997 A1* | 7/2013 | Barzel | G06F 16/51 345/501 |
| 2014/0089588 A1* | 3/2014 | Redoutey | G06F 17/3048 711/125 |
| 2014/0236887 A1* | 8/2014 | Nelson | G06F 17/30289 707/610 |
| 2014/0258240 A1 | 9/2014 | Choi et al. | |

(Continued)

OTHER PUBLICATIONS

Daudjee (Lazy Database Replication with Ordering Guarantees (Proceedings of the 20th International Conference on Data Engineering (ICDE'04), 2004).*

(Continued)

*Primary Examiner* — Chris Parry
*Assistant Examiner* — Weiwei Y Stiltner
(74) *Attorney, Agent, or Firm* — Robert C. Kowert; Kowert, Hood, Munyon, Rankin & Goetzel, P.C.

(57) ABSTRACT

A client host may be used to provide access to a shared storage. The client host may receive a read request from a local client for particular data of the shared storage. In response to the read request, the client host may obtain the particular data from a local storage device. The client host may receive a write request from the local client for the shared storage. In response to the write request, the client host may send data to a network-based stream service as one or more stream events for the shared storage. After sending the one or more stream events to the network-based stream service, the client host may receive, from the network-based stream service, an ordered stream event for the shared storage. Based at least in part on the ordered stream event, the client host may update the data stored at the local storage device.

23 Claims, 9 Drawing Sheets

(56) References Cited

U.S. PATENT DOCUMENTS

| | | | |
|---|---|---|---|
| 2014/0258241 A1* | 9/2014 | Chen | G06F 17/30371 |
| | | | 707/683 |
| 2015/0074407 A1* | 3/2015 | Palmeri | H04L 63/0823 |
| | | | 713/171 |
| 2015/0363464 A1* | 12/2015 | Alves | G06F 16/24568 |
| | | | 707/765 |
| 2016/0071233 A1* | 3/2016 | Macko | G06T 11/206 |
| | | | 345/440 |
| 2016/0085837 A1* | 3/2016 | Kotagiri | G06F 17/30575 |
| | | | 707/634 |

OTHER PUBLICATIONS

U.S. Appl. No. 14/538,752, filed Nov. 11, 2014, Kharatishvili, et al.

* cited by examiner

STREAM-BASED SHARED STORAGE SYSTEM

BACKGROUND

Distributed database systems offer a host of advantages to users. For example, distributed database systems provide opportunities to balance the workload performed among different nodes, systems, or devices, in order to optimize various different functions, such as performing read or write requests. Risk of failure may be dispersed among different nodes so that one or more individual failures may be tolerated in the distributed database system. Additionally, distributed database systems may be scaled more easily than traditional monolithic database systems in order to account for growing computational and other resource demands. In the face of these appealing benefits, various different implementation challenges for distributed database systems may occur.

Coordination problems between various nodes can, for example, occur, especially when operating on a common or shared set of data. One way to some overcome coordination problems is to implement a lock-based system where only one node at a time may operate on a portion of the data. However, such lock-based systems may undesirably slow operations performed upon the data. Additionally, such lock-based systems may become increasingly complex as additional nodes are added to the system.

A read replica model is one example architecture of a distributed database system that is used to scale out read processing. According to a typical read replica model, as changes are made to the structure of the database, a Structured Query Language (SQL) record may be created in a logical replication log which may then be propagated to all the replicas. Each replica would then run these SQL statements locally on their own versions of the database. Logs are generally shipped asynchronously, causing the read replica to operate at some lag from the primary database.

Figure 1:
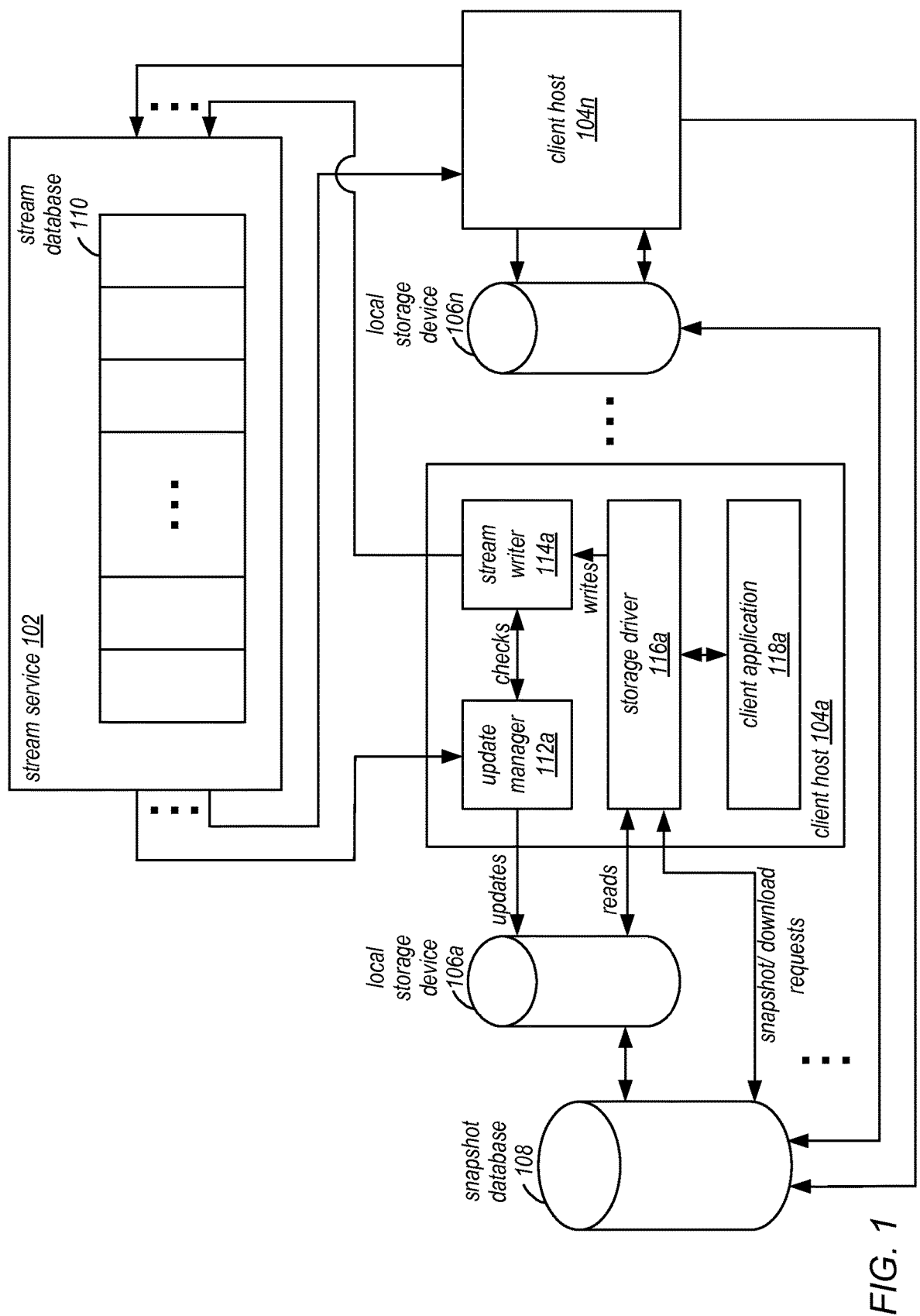
FIG. 1 is a block diagram illustrating operations of an example system that provides a shared storage to a plurality of client hosts.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of a stream-based system that implements a shared data storage are disclosed. In some embodiments, the shared data storage may be replicated among a plurality of local storage devices of a plurality of client hosts. A client host connected to a local storage device may perform a read operation using the local storage device. The client host may perform a write operation by sending one or more stream events indicative of the write operation to a stream service. The stream service may store a plurality of stream events as an ordered sequence and provide the stream events in order to the plurality of client hosts upon request. The client host may receive one or more stream events from the stream service and use the one or more stream events to update the local storage device.

Client hosts may be added to the system using a snapshot of a local storage device, where metadata of the snapshot indicates a sequence number such that the new client host can retrieve updates added to the stream service after the snapshot using the sequence number. A snapshot of a local storage device may be a fixed point-in-time representation of the state of the local storage device. In some embodiments, snapshots may be stored remotely from a computing device maintaining the local storage device, such as in another storage device or at a dedicated snapshot storage. Snapshot operations may be performed to send, copy, and/or otherwise preserve the snapshot of a given data volume in another storage location, such as a remote snapshot data store in other storage service.

Accordingly, a system is described herein where a plurality of client hosts may quickly read from a shared storage implemented at a local storage device and may update the shared storage by sending stream events to the stream service. In some embodiments, the system operates without the use of lock-based mechanisms (e.g., mutexs or semaphores) on the shared storage. Additionally, in some cases, the client hosts may not need to (and may not be configured to) communicate with one another to maintain the shared storage (e.g., because the storage service may be used to coordinate updates to the shared storage).

FIG. 1 is a block diagram illustrating operations of an example system that provides a shared storage to a plurality of client hosts. In this example, the system includes a stream service 102, a plurality of client hosts 104*a-n*, a plurality of local storage devices 106*a-n*, and a snapshot database 108.

The stream service 102 includes a stream database 110. The client host 104a includes a respective update manager 112a, stream writer 114a, storage driver 116a, and client application 118a. In some embodiments, such as the embodiment illustrated below with reference to FIG. 2, other client hosts of the plurality of client hosts 104a-n also include respective update managers, stream writers, storage drivers, and client applications.

The local storage devices 106a-n may implement individual instances of a shared storage. In some embodiments, each local storage device of the local storage devices 106a-n may separately store all data of the shared storage. Accordingly, the client hosts 106a-n may access the respective local storage devices 106a-n independently. As a result, in some embodiments, read operations may be performed at the respective local storage devices 106a-n without using lock-based mechanisms (e.g., because the respective local storage devices 106a-n are not being used to respond to requests by other client hosts). The read operations may also be performed more quickly, as compared to a system that implements lock-based mechanisms (e.g., because processes may not need to wait for other processes to release a lock to perform a read operation). As discussed further below, in some cases, the data of the shared storage at one of the local storage devices 106a-n (e.g., the local storage device 106a) may at least temporarily differ from the data of the shared storage of another of the local storage devices 106a-n, however, the system may be configured such that eventually all changes to the shared storage are propagated to the local storage devices 106a-n.

The client host 104a may be configured to provide a local client with read/write access to a shared storage (e.g., a shared data set). Accordingly, the client host 104a may receive one or more client instructions (e.g., input/output requests) via the client application 118a. In some embodiments, the client application 118a may be software provided by an external client (e.g., a client of a remote processing service) that runs on the client host 104a. In other embodiments, the client application 118a may be remote to the client host 104a and may transmit instructions to the client host 104a via an interface (not shown). In response to the one or more client instructions, the client host 104a may perform processing and/or data storage operations and may send one or more responses to the local client, as discussed further below. In some embodiments, the client host 104a may be implemented by several separate devices (e.g., connected via a network).

The client host 104a may receive the client instructions at the storage driver 116a. The storage driver 116a may implement an interface configured to interpret the one or more client instructions and instruct other portions of the client host 104a in response to the one or more client instructions. In some embodiments, the storage driver 116a may be a file system interface (e.g., a portable operating system interface (POSIX) interface) configured to interact with the client application 118a. The storage driver 116a may be configured to obtain corresponding data from the local storage device 106a in response to a read request from the client application 118a and may be configured to forward a write request to the stream writer 114a in response to the write request. For example, in response to receiving a read request from the client application 118a, the storage driver 116a may send a read address to the local storage device 106a and, in response to receiving data corresponding to the read request from the local storage device 106, the storage driver 116a may send the data to the client application 118a. In response to receiving a write request from the client application 118a, the storage driver 116a may forward the write request to the stream writer 114a. In some embodiments, the storage driver 116a may reformat the write request prior to forwarding the write request to the stream writer 114a. In a particular embodiment, the storage driver 116a may be configured to track one or more write operations and may delay one or more subsequent read operations until the local storage device 106a has been updated based at least in part on the one or more write operations. In some embodiments, the client application 118a may send the write request to the stream writer 114a directly. As discussed further below with reference to FIGS. 6 and 7, the storage driver 116a may be further configured to implement a snapshot operation, a configuration operation, or both.

The client host 104a may use the stream writer 114a to request modifications to the shared storage. The stream writer 114a may receive a write request from a local client (e.g., via the client application 118a or via the storage driver 116a). In some cases, in response to the write request, the stream writer 114a may format the write data into a stream event and send the stream event to the stream service 102. However, a stream event may have a fixed maximum size and the write request may include more data than the size of a single stream event. Accordingly, in some cases, in response to a write request, the stream writer 114a may send multiple stream events to the stream service 102. The one or more stream events may include an address targeted by the stream event, data to write at the address, and an indication of a client or a client host requesting the write. In some embodiments, the stream writer 114a may indicate completion of a write operation (corresponding to one or more stream events) as part of a stream event. In other embodiments, completion of a write operation may be implied. For example, the system may be configured such that each stream event corresponds to a complete write. Accordingly, a stream event may not include an indication of a completion of a write operation (e.g., because each stream event is a complete write operation).

The stream service 102 (e.g., a network-based stream service) may store one or more stream events in the stream database 110. In some embodiments, the stream database 110 may be a circular buffer configured to store a most recent N (e.g., 50 or 1000) updates to the local storage. The stream service 102 may order the stream events (e.g., in an order in which the stream events were received) and may assign each stream event a corresponding sequence number. The stream service 102 may be configured to provide stream events to the plurality of client hosts 104a-n in response to requests for the stream events or may proactively broadcast new stream events or sequence numbers of new stream events (e.g., so the new stream events can be requested by the plurality of client hosts 104a-n) as the new stream events are received. To illustrate, in response to receiving a request for a stream event and a sequence number from a client host, the stream service 102 may be configured to send the client host a next stream event in the order, if the stream database 110 stores one or more stream events having sequence numbers later in the sequence than the received sequence number. Additionally, if the stream database 110 stores multiple stream events more recent than the received sequence number, the stream service 102 may send the next stream event and may further indicate that the stream service 102 still stores more recent stream events. Alternatively, in response to a request for a stream event from a client host, the stream service 102 may send to the client host all stream events stored at the stream database having sequence numbers later in the sequence than the received sequence number. In some cases, different client hosts of the plurality of client hosts 104a-n may have received differing stream events from the stream service 102 (e.g., because some client hosts may request stream events at different times or because the stream service 102 may not be configured to send stream events to all of the plurality of client hosts 104a-n simultaneously). Therefore, in some cases, the plurality of client hosts 104a-n may not store identical versions of the shared storage. However, the stream service 102 may be configured such that the shared storage is updated at all of the plurality of client hosts 104a-n eventually. Accordingly, the stream service 102 may coordinate stream events received from multiple client hosts such that individual client hosts may update the shared storage but the client hosts 104a-n do not need to communicate with each other directly. In other words, in some embodiments, a particular client host is not configured to communicate with other client hosts of the plurality of client hosts 104a-n to update the data of the shared storage. In a particular embodiment, a particular client host is not configured to communicate with other client hosts of the plurality of client hosts 104a-n.

The client host 104a may use the update manager 112a to receive ordered stream events from the stream service 102 and to update the local storage device 106a based at least in part on the ordered stream events. The update manager 112a may periodically request one or more stream events. Alternatively, the update manager 112a may receive a broadcast from the stream service 102 indicating that one or more stream events are available and may request the one or more stream events in response to the broadcast. In response to the request, the update manager 112a may receive the one or more stream events. In some embodiments, the update manager 112a may send (e.g., directly or via the storage driver 116a) one or more write requests to the local storage device 106a, requesting one or more updates to the shared storage at the local storage device 106a. Additionally, if a particular stream event does not indicate completion of an associated update (e.g., only a portion of a write has been received), the update manager 112a may buffer contents of the stream event until one or more additional stream events have been received that complete the associated update. For example, the update manager 112a may store the one or more incomplete updates in an ordered list of incomplete shared storage updates. As discussed further below with reference to FIG. 5, the update manager 112a may be configured to ignore one or more stream events in response to detecting that the one or more stream events indicate modifications to a portion of the shared storage that corresponds to one or more incomplete updates from a different client. For example, if an incomplete update corresponding to client host 104a is stored at the update manager 112a, the update manager 112a may be configured to ignore one or more stream events indicating an update to a same portion of the shared storage received from the client host 104n prior to completion of the incomplete update from the client host 104a. Additionally, in response to detecting that a particular incomplete update has not been modified within a particular duration, the update manager 112a may be configured to discard the one or more incomplete updates. The update manager 112a may further notify a corresponding client (e.g., a local client), the stream service 102, or another entity prior to discarding the one or more incomplete updates. Accordingly, the update manager 112a may be used to provide write data to the local storage device 106a from all of the plurality of client hosts 104a-n, thus maintaining the data of the shared storage at the local storage device 106a.

In some embodiments, the stream writer 114a is configured to indicate a failure of a write operation to the client application 118a (e.g., directly or via the storage driver 116a). Prior to sending one or more stream events that address a particular file of the shared storage, the stream writer 114a may check with the update manager 112a to determine whether the update manager 112a is currently buffering an incomplete update from another client that targets the particular file. In response to detecting that the update manager 112a is buffering an incomplete update from another client that targets the particular file, the stream writer 114a may not send the write request to the stream service 102. Instead, the stream writer 114a may indicate a write failure to the client application 118a. Additionally, the stream writer 114a may be configured, after sending one or more stream events to the stream service 102, to wait for an update from the update manager 112a confirming that the one or more stream events were successfully received. In response to receiving an indication that the one or more stream events were successfully received, the stream writer 114a may indicate to the client application 118a that the write request was processed successfully. In some embodiments, the stream writer 114a may be configured to indicate a failure to the client application 118a if the stream writer 114a does not receive an indication that the one or more stream events were successfully received by the update manager 112a within a particular period of time (e.g., a timeout threshold).

In some embodiments, a number of stream events stored at the stream database 110 may be adaptively modified based at least in part on one or more factors. The one or more factors may include, for example, a ping to at least one of the plurality of client hosts 104a-n, a request from at least one of the plurality of client hosts 104a-n, a number of stream events received within a particular amount of time, an anticipated service delay at the stream service 102 (e.g., a context switch), or any combination thereof. For example, the stream service 102 may decide to increase a number of stream events for the shared storage stored at the stream database 110 in response to determining that a highest ping to a client host (e.g., the client host 104a) of a plurality of pings to the plurality of client hosts 104a-n is within a particular percentage (e.g., 90%) of an amount of time a particular stream event takes to propagate through the stream database 110. The stream service 102 may decrease the number of stream events stored at the stream database 110 in response to the ping decreasing below a ping threshold.

In some embodiments, the stream service 102 may implement multiple streams (e.g., streams functioning similarly to the stream of the stream database 110 but corresponding to multiple different shared storages). Additionally one or more of the plurality of client hosts 104a-n may be associated with more than one of the multiple streams. Accordingly, in some cases, one or more of the plurality of client hosts 104a-n may be associated with a particular different stream of the stream service 102, one or more of the plurality of client hosts 104a-n may not be associated with the particular different stream of the stream service 102, and one or more different client hosts (not shown) may be associated with the particular different stream (e.g., the multiple streams may be associated with different groups of client hosts).

In some embodiments, snapshots and associated metadata may be periodically created by one or more of the plurality of client hosts 104a-n and stored at the snapshot database 108 (e.g., in response to a local client request or in response to an instruction generated by a processor of the client host).

For example, the client host 104*a* may be configured to create a snapshot and associated metadata once per day and store the snapshot and the metadata in the snapshot database 108. Additionally, the client host 104*n* may be configured to create another snapshot and associated other metadata once per day (e.g., at a different time per day) and store the other snapshot and the other associated metadata in the snapshot database 108. The snapshot may include data of the shared storage stored at an associated device (e.g., the local storage device 106*a*). The metadata may include a sequence number corresponding to a most recent update reflected in the snapshot and associated metadata. As discussed above, in some cases, incomplete updates are stored at an update manager (e.g., the update manager 112*a*) until one or more future stream events are received that complete the incomplete updates. The metadata may further include data corresponding to the one or more incomplete updates. In some embodiments, the plurality of client hosts 104*a-n* may be configured to generate snapshots and associated metadata such that at least one snapshot and associated metadata stored at the snapshot database 108 includes at least some of the updates indicated by the one or more stream events stored at the stream database 110. The client host creating the snapshot and associated metadata may be configured to disable input/output requests during the snapshot and metadata creation process. In some embodiment, the snapshot database 108 may not be used. For example, the snapshot and associated metadata may be stored together at or divided between one or more of the plurality of client hosts 104*a-n*. Alternatively, the stream service 102 may store all updates to the shared storage (e.g., at the stream database 110).

In some embodiments, an additional client host may be added to the plurality of client hosts 104*a-n*. The additional client host may receive the shared storage using a snapshot mechanism. Accordingly, in the illustrated embodiment, as part of a connection process, the additional client host, may request a snapshot and associated metadata for the shared storage from the snapshot database 108. The snapshot and metadata may include at least one update indicated by the one or more stream events stored at the stream database 110. As noted above, the metadata may include a sequence number corresponding to a most recent update reflected in the snapshot. The metadata may further include data corresponding to one or more incomplete updates, which may be sent to respective update managers of the one or more additional client hosts. The snapshot may be sent to an associated local storage device (e.g., directly or via the associated client host). The metadata may be sent to an update manager of the client host (e.g., directly or via another component such as the associated storage driver). Subsequent to receiving the metadata and the associated local storage device receiving the snapshot data, the additional client hosts may request one or more updates from the stream service 102 and then enable input/output processing to one or more associated local clients. Alternatively, in other embodiments, rather than communicating with the snapshot database 108, the additional client host may request the shared storage and associated metadata from another client host of the plurality of client hosts 104*a-n*.

As used herein, "local" refers to an entity that interacts with the system via a corresponding client host. For example, a "local" storage device may refer to a storage device that communicates with a client host of the plurality of client hosts 104*a-n*. In some cases, the storage device may only be "local" to a single client host at a time. In some embodiments, a "local" storage device is physically coupled to or integrated into the associated client host. However, in other embodiments, a "local" storage device may be physically remote from the client host, such as in a remote storage system. For example, a "local" storage device may be located in a different data center but may be connected to the client host via a network. Additionally, in some embodiments, the "local" storage device may correspond to a single, physical device. However, in other embodiments, the "local" storage device may correspond to a virtual storage device formed of a plurality of interconnected storage devices. As another example, a "local" client may refer to a client that sends requests to a client host of the plurality of client hosts 104*a-n*. In some cases, the client only communicates with a single client host at a time. However, in other cases, the client may be "local" to multiple client hosts (e.g., client hosts configured to implement different shared storages).

Figure 2:
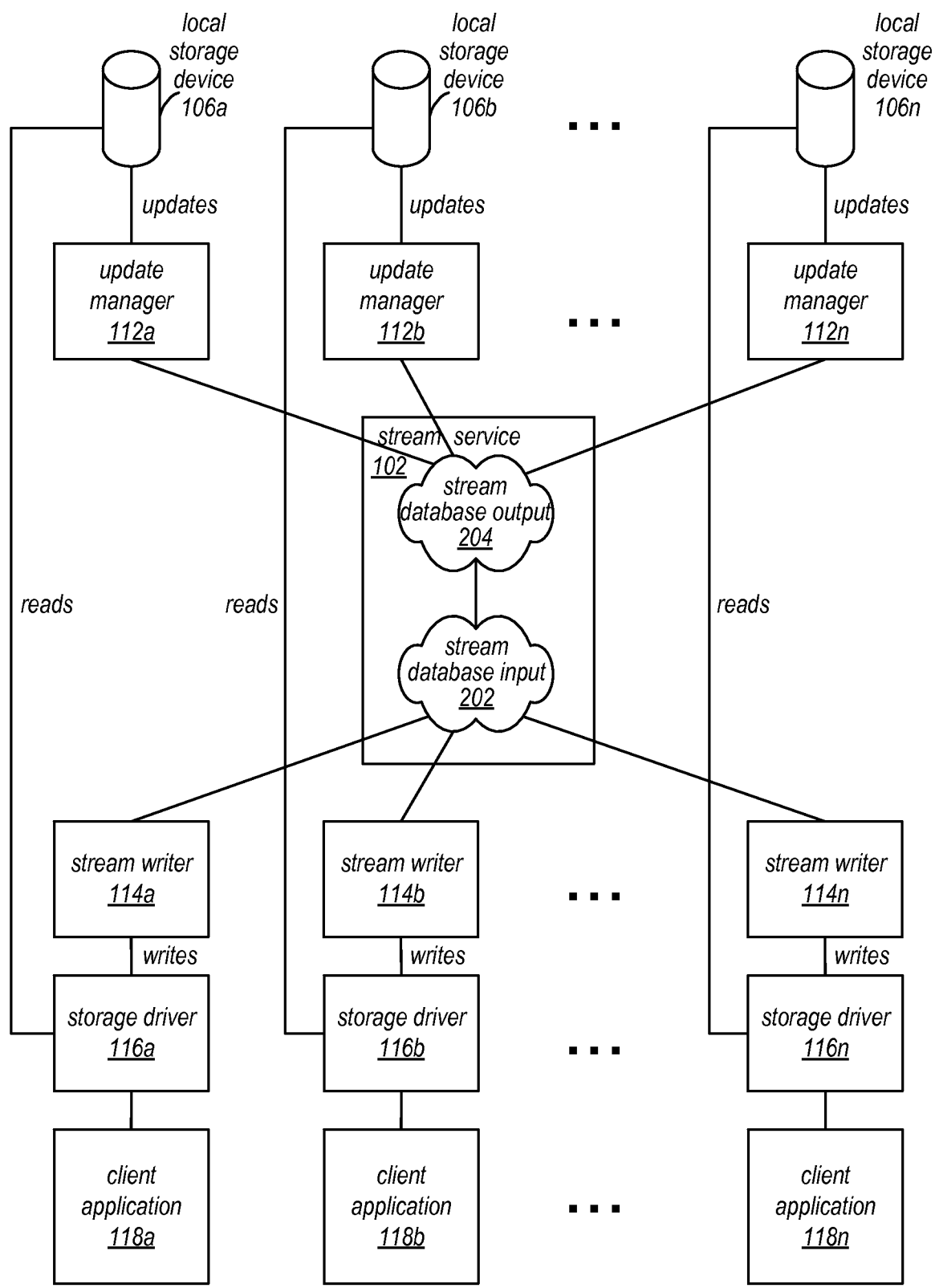
FIG. 2 is a block diagram illustrating relationships between various portions of an example system that provides a shared storage to a plurality of client hosts.

FIG. 2 a block diagram illustrating relationships between various portions of an example system that provides a shared storage to a plurality of client hosts. In the illustrated embodiment, portions of the system of FIG. 1 are illustrated in a manner that illustrates process flows of read operations and write operations. In this example, the system includes the stream service 102, the plurality of local storage devices 106*a-n*, and the update managers 112*a-n*, the stream writers 114*a-n*, the storage drivers 116*a-n*, and the client applications 118*a-n* of the plurality of client hosts 104*a-n* of FIG. 1. Additionally, the stream service 102 includes a stream database input 202 and a stream database output 204. Although the example below is provided with reference to the client application 118*a*, the storage driver 116*a*, the stream writer 114*a*, the update manager 112*a*, and the local storage device 106*a*, in some cases, other corresponding portions of the system may be configured to perform similarly.

As discussed above, the client application 118*a* may make memory requests (e.g., read requests or write requests) targeting a shared storage implemented by the local storage device 106*a*. In the illustrated embodiment, the requests may be sent to the storage driver 116*a*. In response to read requests, the storage driver 116*a* may request corresponding data from the local storage device 106*a* directly. In response to write requests, the storage driver 116*a* may send the write requests to the stream writer 114*a*. The stream writer 114*a* may format a write request into one or more stream events and send the one or more stream events to the stream service 102 (e.g., to the stream database 110) via the stream database input 202. The update manager 112*a* may retrieve updates from the stream service 102 (e.g., from the stream database 110) via the stream database output 204. In response to detecting that one or more of the retrieved stream events completes one or more updates to the shared storage, the update manager 112*a* may send the one or more updates to the local storage device 106*a*. Accordingly, the stream service 102 may be used to maintain a shared storage at the local storage device 106*a* from the plurality of client hosts 104*a-n* without the use of lock-based mechanisms.

Figure 3A:
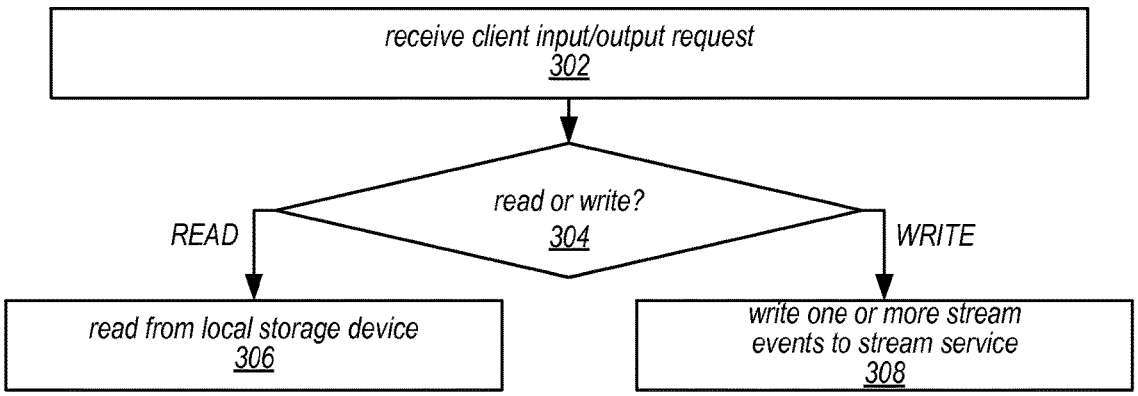
FIG. 3A is a flow diagram illustrating one embodiment of a method for responding to a client input/output request.

As described above, in one example of a stream-based shared storage system, a client may request one or more memory operations (e.g., input/output requests). A client host may perform read operations using a local storage device and may perform write operations using a stream service. One embodiment of a method for responding to a client input/output request is illustrated by the flow diagram of FIG. 3A.

As illustrated at 302, in this example, the method may include receiving a client input/output request. For example, the storage driver 116*a* of FIG. 1 may receive an input/ output request from the client application 118a. As illustrated at 304, in this example, the method may include determining whether the client input/output request is a read request or a write request. For example, the storage driver 116a may be configured to identify if an input/output request from the client application 118a is a read request or a write request.

As illustrated at 306, in this example, in response to the input/output request being a read request, the method may include reading from a local storage device. For example, in response to detecting a read request, the storage driver 116a may read corresponding data from the local storage device 106a. As illustrated at 308, in response to the input/output request being a write request, the method may include writing one or more stream events to a stream service. For example, in response to detecting a write request, the storage driver 116a may forward the write request to the stream writer 114a, which may format the write request as one or more stream events and send the one or more stream events to the stream service 102. Thus, the method of FIG. 3A may enable responding to a client input/output request.

Figure 3B:
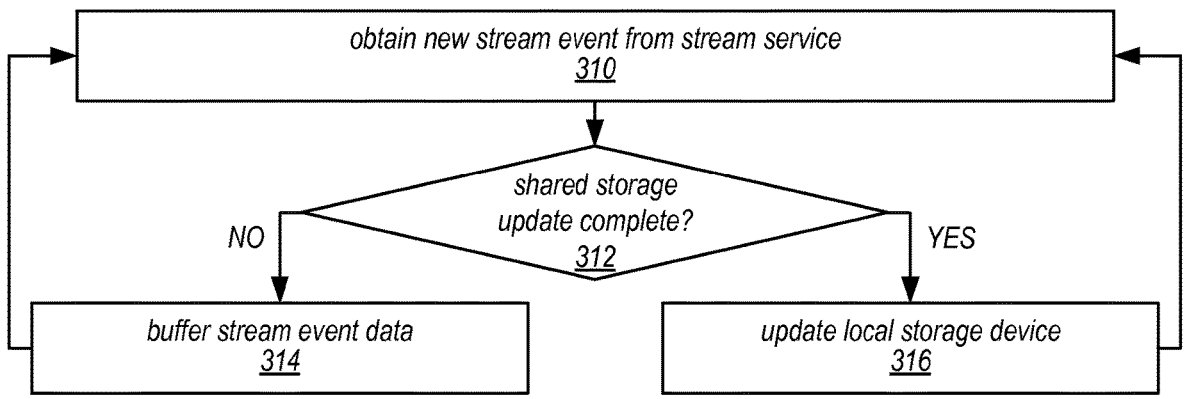
FIG. 3B is a flow diagram illustrating one embodiment of a method for updating a local storage device that provides a shared storage to a client host.

As described above, in one example of a stream-based shared storage system, a client host may obtain stream events from a stream service and update, based at least in part on the stream events, a shared storage implemented by a local storage device. In some cases, the stream events may correspond to incomplete updates to a shared storage. In some cases, the client host may be configured to update the shared storage only using completed updates. One embodiment of a method for updating a local storage device that provides a shared storage to a client host is illustrated by the flow diagram of FIG. 3B. Although FIG. 3B illustrates operations being performed in a particular order, in other embodiments, some operations may be omitted, performed in other orders, or performed in parallel.

As illustrated at 310, in this example, the method may include obtaining a new stream event from a stream service. For example, the update manager 112a of FIG. 1 may obtain a new stream event from the stream database 110 of the stream service 102. As discussed above, the update manager may receive stream events individually or may receive several stream events in response to a single request. As illustrated at 312, in this example, the method may include determining whether a shared storage update is complete. For example, completion of a shared storage update may be implicit (e.g., because every stream event is a complete update). Alternatively, the update manager 112a may be configured to detect an indication of completion of a shared storage update (e.g., a file close request).

As illustrated at 314, in this example, in response to the stream event not completing the shared storage update, the method may include buffering the stream event data. For example, in response to the update manager 112a determining that the new stream event does not complete a corresponding shared storage update, the update manager 112a may buffer stream event data (e.g., at least a portion of the stream event) in a list of incomplete shared storage updates. After buffering the stream event data, in this example, the method may proceed to 310.

As illustrated at 314, in this example, the method may include updating a local storage device. For example, in response to the update manager 112a (explicitly or implicitly) determining that the new stream event completes a shared storage update, the update manager 112a may update the shared storage at the local storage device 106a using the shared storage update. After updating the local storage device, in this example, the method may proceed to 316. In other embodiments, the method may proceed to 310 prior to updating the local storage device or in parallel with updating the local storage device. Thus, the method of FIG. 3B may enable updating a local storage device that provides a shared storage to a client host.

Figure 4:
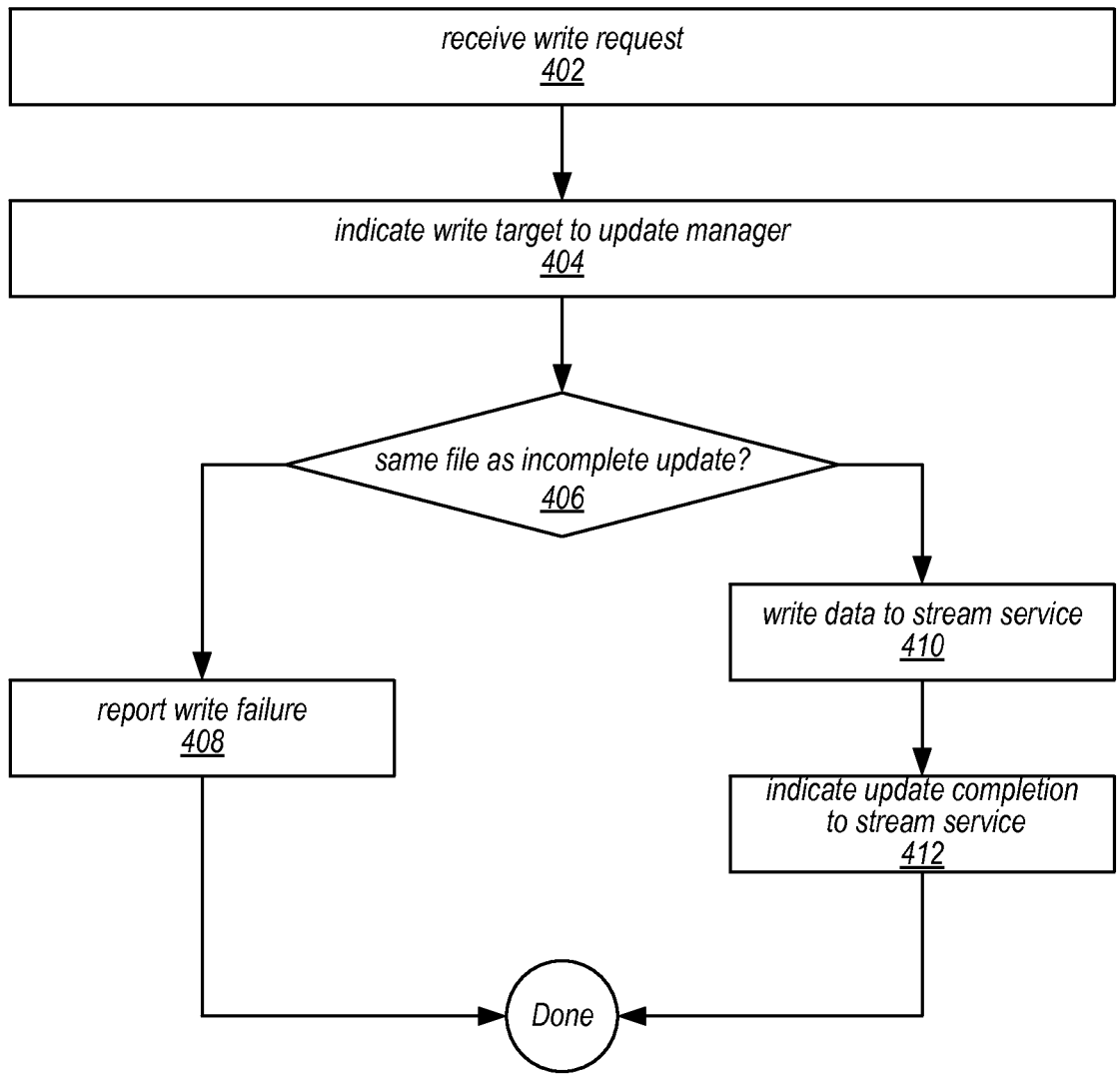
FIG. 4 is a flow diagram illustrating one embodiment of a method for monitoring writing to a shared storage.

As described above, in some cases, a stream writer may attempt to detect a potential write failure prior to writing an update to the stream service. One way the stream writer may to detect a potential write failure is to by determining whether a write target of a write request matches an incomplete update at an associated update manager. One embodiment of a method for a method for monitoring writing to a shared storage is illustrated by the flow diagram of FIG. 4. Although FIG. 4 illustrates operations being performed in a particular order, in other embodiments, some operations may be omitted, performed in other orders, or performed in parallel. In some embodiments, FIG. 4 describes an operation performed as part of 308 of FIG. 3A.

As illustrated at 402, in this example, the method may include receiving a write request. For example, the stream writer 114a of FIG. 1 may receive a write request from the client application 118a (e.g., directly or via the storage driver 116a). As illustrated at 404, in this example, the method may include indicating a write target to an update manager. For example, the stream writer 114a may indicate a write target of the write request to the update manager 112a.

As illustrated at 406, in this example, the method may include determining whether the write target addresses a same file as an incomplete update. For example, the stream writer 114a may receive, from the update manager 112a, an indication of whether the write target addresses a same file as one of the list of incomplete updates. As illustrated at 408, in this example, in response to the write target addressing a same file as an incomplete update, the method may include reporting a write failure. For example, in response to the stream writer 114a determining that the write request targets a same file as one of the list of incomplete updates, the stream writer 114a may inform the client application 118a (e.g., directly or via the storage driver 116a) that the write operation failed. In other embodiments, the write failure may be reported by other portions of the client host 104a (e.g., the update manager 112a). After reporting the write failure, in this example, the stream writer may prevent data associated with the write request from being sent to the stream service and the method may complete. Thus, the method of FIG. 4 may enable a method for monitoring writing to a shared storage.

As illustrated at 410, in this example, in response to the write target not addressing a same file as an incomplete update, the method may include writing data to a stream service. For example, the stream writer 114a may write data indicated by the write request to the stream service 102 using one or more stream events. As illustrated at 412, in this example, the method may include indicating an update completion to the stream service. For example, the stream writer 114a may indicate a file close to the stream service 102 as part of the one or more stream events. Alternatively, indicating the update completion may be performed implicitly, as described above. After indicating the update completion, in this example, the method may complete.

In some embodiments, as described above, after indicating the update completion, the stream writer may be configured to determine whether the write successfully propagated to the local storage device. For example, the stream writer (or another portion of the client host) may report a successful write to the client application in response to receiving an indication from the update manager that a write corresponding to the write request was successfully performed at the local storage device. Alternatively, the stream writer (or another portion of the client host) may indicate a failed write if the stream writer does not receive an indication from the update manager within a particular period of time that a write corresponding to the write request was successfully performed at the local storage device.

Figure 5:
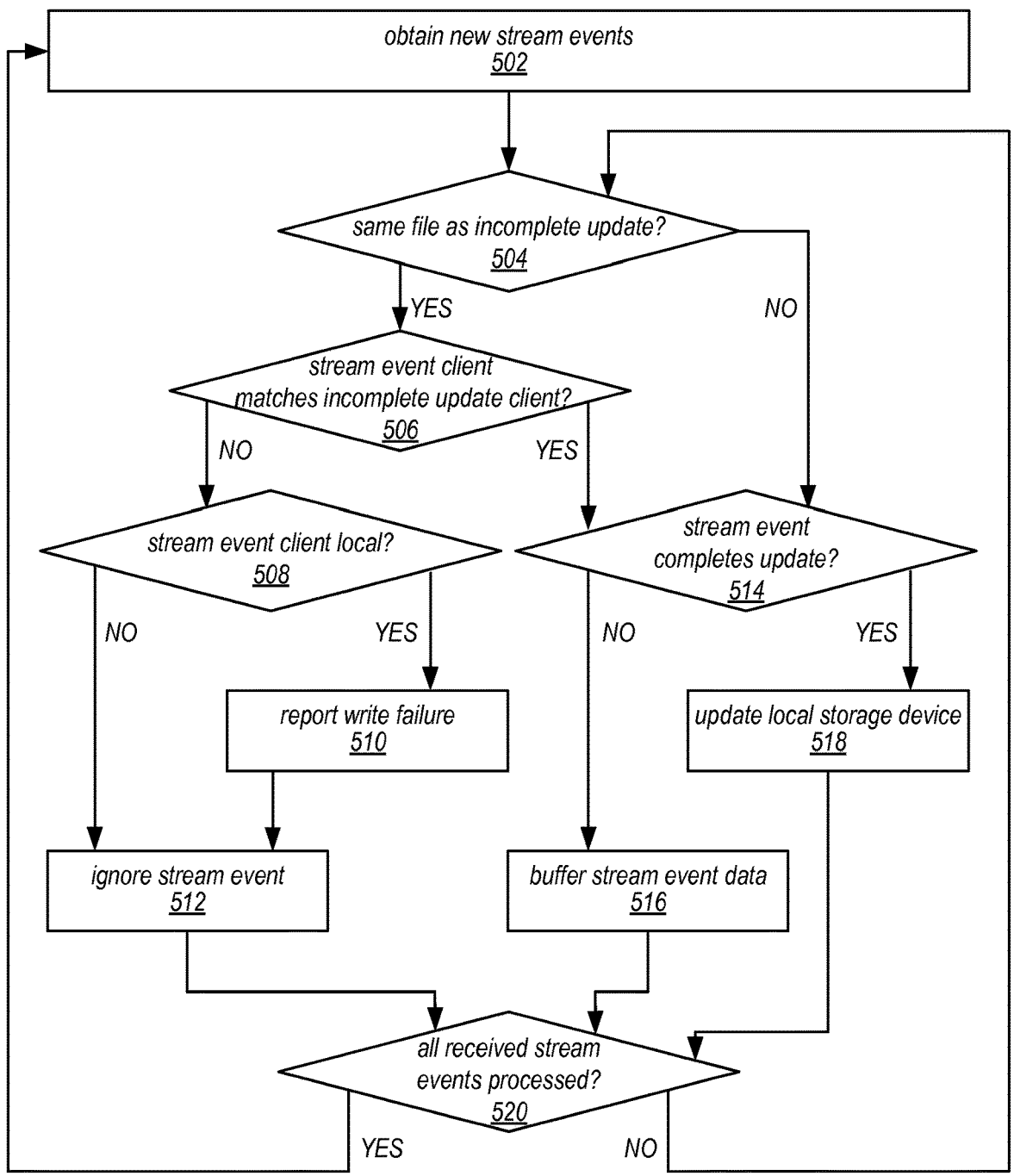
FIG. 5 is a flow diagram illustrating one embodiment of a method for updating a local storage device that provides a shared storage to a client host.

As described above, in one example of a stream-based shared storage system, a client host may obtain stream events from a stream service and update, based at least in part on the stream events, a shared storage implemented by a local storage device. In some cases, the stream events may correspond to incomplete updates to a shared storage. In some cases, the client host may be configured to update the shared storage only using completed updates. In some cases, the client host may receive multiple stream events in response to a single request and may process the multiple stream events sequentially. One embodiment of a method for updating a local storage device that provides a shared storage to a client host is illustrated by the flow diagram of FIG. 5. Although FIG. 5 illustrates operations being performed in a particular order, in other embodiments, some operations may be omitted, performed in other orders, or performed in parallel. In some embodiments, FIG. 5 describes the operations of FIG. 3B.

As illustrated at 502, in this example, the method may include obtaining new stream events. For example, the update manager 112a of FIG. 1 may obtain one or more new stream events from the stream service 102. The client host may consider the new stream events individually. As illustrated at 504, in this example, the method may include determining whether a stream event corresponds to a same file as an incomplete update. For example, the update manager 112a may determine whether a received stream event corresponds to a same file as an incomplete update previously received at the update manager 112a.

As illustrated at 506, in this example, in response to determining that the stream event addresses a same file as an incomplete update, the method may include determining whether a stream event client matches an incomplete update client. For example, the update manager 112a may identify a client or client host that requested the stream event and may determine whether the identified client or client host matches a client or client host that requested the incomplete update. As illustrated at 508, in this example, in response to determining that the stream event client does not match the incomplete update client, the method may include determining whether the stream event client is local. For example, the update manager 112a may determine (e.g., based on an identifier in the stream event) whether the stream event was requested by the client host 104a.

As illustrated at 510, in this example, in response to determining that the stream event client is local, the method may include reporting a write failure. For example, the update manager 112a may send an error report to the stream writer 114a indicating that the write failed. In some cases, the report may indicate that the write failed due to an incomplete update by another stream service client. As illustrated at 512, in this example, in response to determining that the stream event client is not local at 508 or after reporting the write failure at 510, the method may include ignoring the stream event. For example, the update manager 112a may ignore (e.g., may not buffer any data or send any other signals regarding the stream event) the stream event. After ignoring the stream event, in this example, the method may proceed to 520, discussed further below.

As illustrated at 514, in this example, in response to determining that the received stream event does not address a same file as an incomplete update at 504 or in response to determining that the stream event client matches an incomplete update client at 506, the method may include determining whether the stream event completes an associated shared storage update. For example, the update manager 112a may determine whether a new stream event completes an associated shared storage update after determining that the stream event does not correspond to any incomplete updates (e.g., the stream event addresses a new file). As another example, the update manager 112a may determine whether a new stream event completes an associated shared storage update after determining that a client that requested the stream event matches a client that requested the incomplete update (e.g., the stream event continues a previous shared storage update).

As illustrated at 516, in this example, in response to determining that the stream event does not complete the associated shared storage update, the method may include buffering the stream event data. For example, the update manager 112a may buffer the stream event data in a list of incomplete shared storage updates. After buffering the stream event data, the method may proceed to 520, discussed further below. As illustrated at 518, in this example, determining that the stream event completes the associated shared storage update, the method may include updating the local storage device. For example, the update manager 112a may send an update to the local storage device 106a, indicating the shared storage update (e.g., indicated by the new stream event and any previous stream events stored at the update manager 112a as incomplete updates that address the same file as the new stream event). After updating the local storage device, the method may proceed to 520.

As illustrated at 520, in this example, after ignoring the stream event at 512, buffering the stream event data at 516, or updating the local storage device at 518, the method may include determining whether all received stream events have been processed. As discussed above, in some cases, the update manager 112a may receive multiple stream events from the stream service 102 in response to a stream event request. Accordingly, the update manager 112a may process the multiple stream events in a batch. In this example, in response to at least some received stream events being unprocessed, the method may return to 504 regarding an unprocessed stream event. In this example, in response to all received stream events being processed, the method may return to 502. However, in other embodiments, new stream events may be retrieved prior to the update manager 112a completing processing of all of the received stream events (e.g., in response to a number of unprocessed stream events being less than a threshold). Thus, the method of FIG. 5 may enable updating a local storage device that provides a shared storage to a client host.

Figure 6:
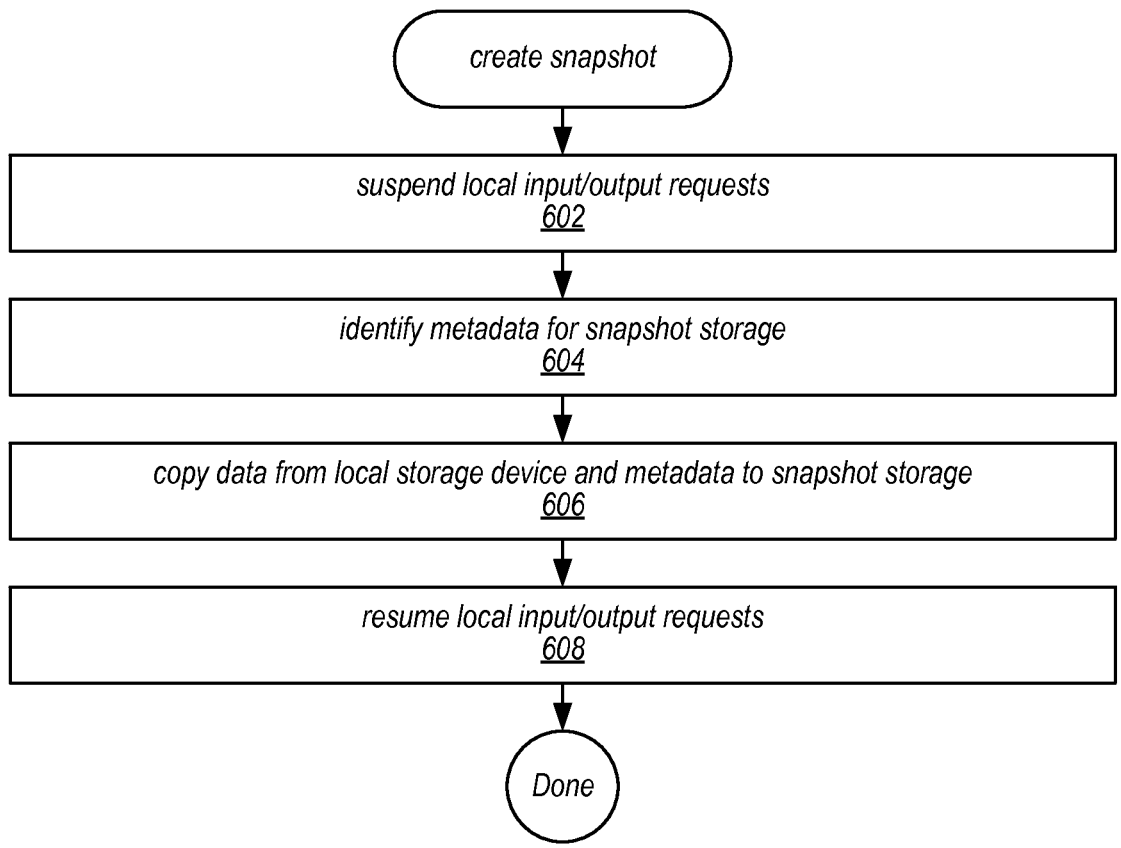
FIG. 6 is a flow diagram illustrating one embodiment of a method for creating a snapshot of a shared storage.

As described above, a client host may create snapshot data and associated metadata that can be used by a client host to enable access to the stream-based shared storage system. One embodiment of a method for creating a snapshot of a shared storage is illustrated by the flow diagram of FIG. 6. Although FIG. 6 illustrates operations being performed in a particular order, in other embodiments, some operations may be omitted, performed in other orders, or performed in parallel.

As illustrated at 602, in this example, the method may include suspending local input/output requests. For example, in response to an instruction to create a snapshot (e.g., from a client or from a component of a client host such as the storage driver 116a of FIG. 1), the client host 104a may suspend input/output requests (e.g., requests to and from the stream service 102). As illustrated at 604, in this example, the method may include identifying metadata for the snapshot storage. For example, the client host 104a may identify a sequence number corresponding to a most recently received stream event received at the update manager 112a as metadata. Additionally, in some cases, the client host 104a may copy a list of incomplete shared storage updates as metadata.

As illustrated at 606, in this example, the method may include copying data from a local storage device and the metadata to a snapshot storage. For example, the client host 104a may copy the shared storage from the local storage device 106a and the identified metadata to the snapshot database 108. In some embodiments, the client host 104a may instruct the local storage device 106a or the snapshot database 108 to copy the shared storage. In a particular embodiment, rather than using the snapshot database 108, some or all of the snapshot data and associated metadata are stored at one or more of the plurality of client hosts 104a-n, the stream service 102, or any combination thereof. As illustrated at 608, in this example, the method may include resuming the local input/output requests. For example, after copying the snapshot data and metadata to the snapshot storage, the client host 104a may resume local input/output requests (e.g., allowing the shared storage data to be modified). Thus, the method of FIG. 6 may enable creating a snapshot of a shared storage.

Figure 7:
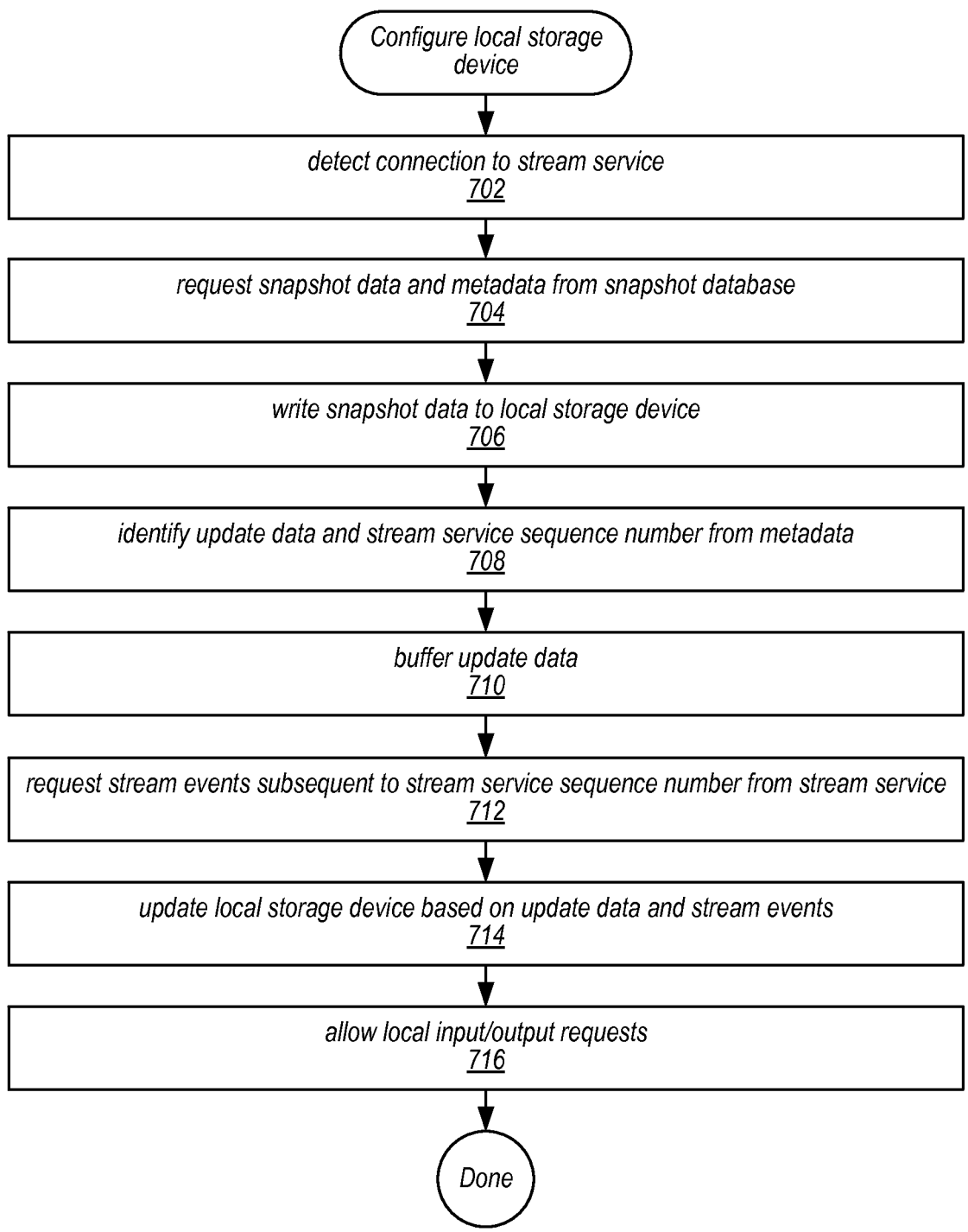
FIG. 7 is a flow diagram illustrating one embodiment of a method for configuring a local storage device to provide a shared storage to a client host.

As described above, a client host may use snapshot data and associated metadata to access to the stream-based shared storage system. One embodiment of a method for configuring a local storage device to provide a shared storage to a client host is illustrated by the flow diagram of FIG. 7. Although FIG. 7 illustrates operations being performed in a particular order, in other embodiments, some operations may be omitted, performed in other orders, or performed in parallel.

As illustrated at 702, in this example, the method may include detecting a connection to a stream service. For example, a new client host may detect a connection to the stream service 102 of FIG. 1 and may determine that an associated local storage device should be configured to store a shared storage. As illustrated at 704, in this example, the method may include requesting snapshot data and metadata from a snapshot database. For example, the new client host may request snapshot data and metadata from the snapshot database 108 associated with the stream service 102.

As illustrated at 706, in this example, the method may include writing snapshot data to a local storage device. For example, the new client host may write snapshot data received from the snapshot database 108 to an associated local storage device. Alternatively, the new client host may initiate the snapshot database 108 transferring the snapshot data directly to the associated local storage device. As illustrated at 708, in this example, the method may include identifying update data and a stream service sequence number from the metadata. For example, the new client host may analyze the metadata and identify a stream service sequence number. Additionally, the new client host may identify update data from the metadata (e.g., if the metadata contains any update data).

As illustrated at 710, in this example, the method may include buffering the update data. For example, if the new client host identifies update data from the metadata, the new client host may store the update data in a list of incomplete updates at an update manager of the new client host. As illustrated at 712, in this example, the method may include requesting stream events subsequent to the stream service sequence number from the stream service. For example, the new client host may request, from the stream service 102, stream events (if any) stored at the stream service 102 having stream service sequence numbers subsequent to the stream service sequence number identified from the metadata.

As illustrated at 714, in this example, the method may include updating the local storage device based on the update data and the stream events. For example, if additional stream events having sequence numbers subsequent to the stream service sequence number identified from the metadata, the new client host may update the shared storage data at the local storage device in a manner similar to that described above with reference to FIG. 3B, FIG. 5, or both. As illustrated at 716, in this example, the method may include allowing local input/output requests. For example, subsequent to the local storage device being updated, the new client host may enable requests to modify data of the shared storage and to receive additional stream events that modify the data of the shared storage. Thus, the method of FIG. 7 may enable configuring a local storage device to provide a shared storage to a client host.

One embodiment of a service system architecture that may be configured to implement a stream-based shared storage system including the systems described by FIGS. 1-7 is shown in FIG. 10. In the illustrated embodiment, the provider network 802 includes a virtual computing service 804, a virtual storage device service 806, a streaming service 808, and an object-redundant data storage service 810. The virtual computing service 804 includes a virtual machine client 822 and a control interface 812. The streaming service 808 includes a stream interface 814. The object-redundant data storage service 810 includes a storage manager 816. In the illustrated embodiment, a number of clients (shown as clients 820a-820n) may be configured to interact with one or more portions of a provider network 802 via the network 818 and the control interface 812, the stream interface 814, the storage manager 816, or any combination thereof. It is noted that where one or more instances of a given component may exist, reference to that component herein may be made in either the singular or the plural. However, usage of either form is not intended to preclude the other.

Figure 8:
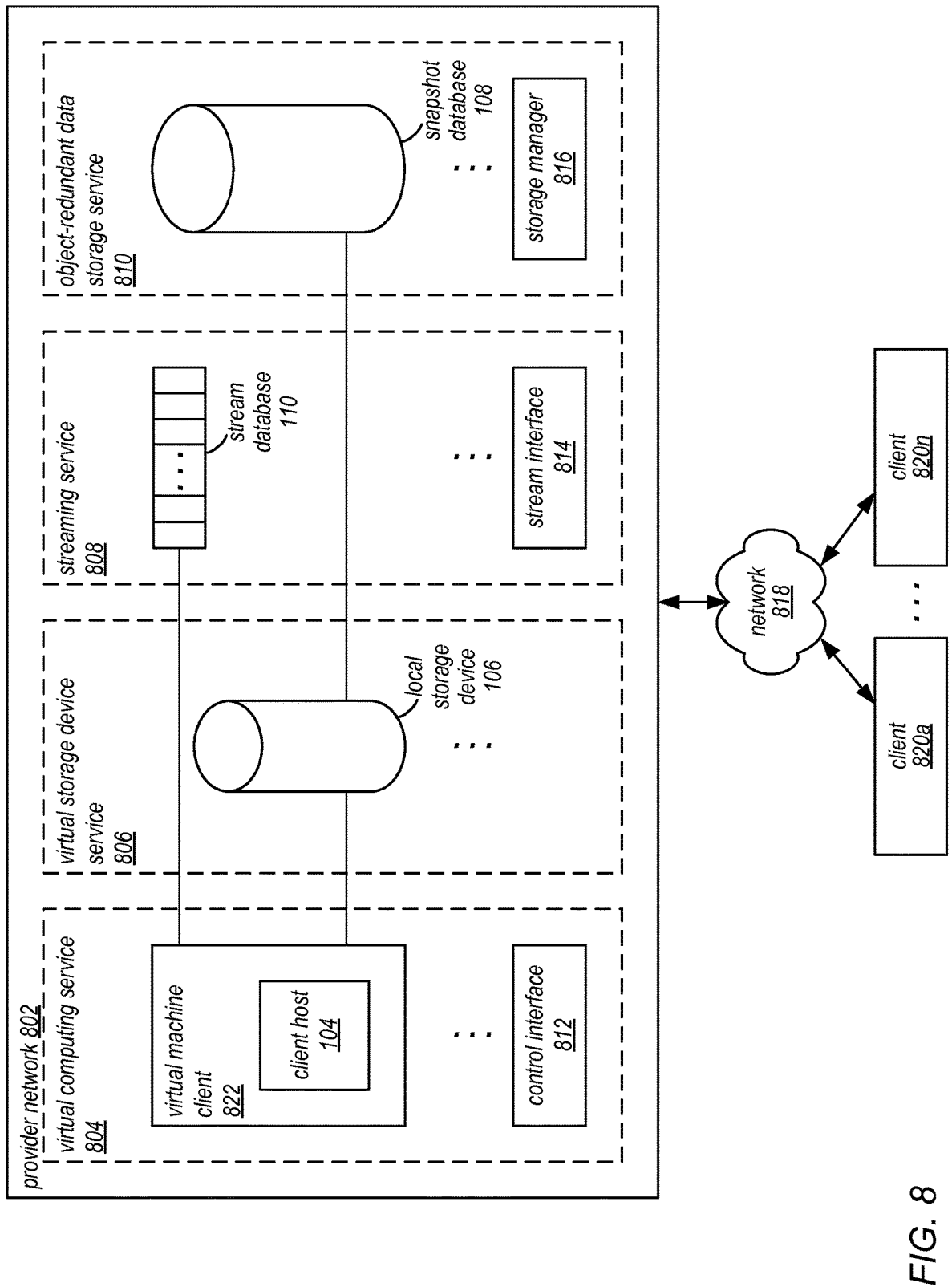
FIG. 8 is a block diagram illustrating a service system architecture that may be configured to provide a shared storage to a plurality of clients, according to some embodiments.

In various embodiments, the components illustrated in FIG. 8 may be implemented directly within computer hardware, as instructions directly or indirectly executable by computer hardware (e.g., a microprocessor, a computer system, or one or more hardware processors), or using a combination of these techniques. For example, the components of FIG. 8 may be implemented by a distributed system including a number of computing nodes (or simply, nodes), such as the computer system embodiment shown in FIG. 9 and discussed below. In various embodiments, the functionality of a given portion of the provider network 802 may be implemented by a particular node or distributed across several nodes. In some embodiments, a given node may implement the functionality of more than one portion of the provider network 802. Additionally, although various portions of FIG. 1 are illustrated as being present in various services of the provider network 802, in other embodiments, the various portions of FIG. 1 are implemented by other services of the provider network 802. For example, although the client host 104 is illustrated as being implemented by the virtual computing service 804, the local storage device 106 is illustrated as being implemented by the virtual storage device service 806, the stream database 110 is illustrated as being implemented by the streaming service 808, and the snapshot database 108 is illustrated as being implemented by the object-redundant data storage service 810, in another embodiment, the all of the illustrated portions of FIG. 1 may be implemented by the virtual computing service 804 or by other services of the provider network 802 in any combination.

Generally speaking, the clients 820a-n may encompass any type of client configurable to submit web services requests to the provider network 802 via the network 818, including input/output requests to the client host 104 and requests to utilize various features of the services of the provider network 802. For example, a given client 820a may include a suitable version of a web browser, or a plugin module or other type of code module configured to execute as an extension to or within an execution environment provided by a web browser. Alternatively, the client 820a may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing network services requests without necessarily implementing full browser support for all types of network-based data. That is, the client 820a may be an application configured to interact directly with the provider network 802 or directly with a service endpoint of the provider network 802 (e.g., directly with the control interface 812, directly with the stream interface 814, directly with the storage manager 816, or any combination thereof). The client 820a may send requests or instructions that are received by an associated client application (e.g., the client application 118a) and forwarded to other portions of the associated client host (e.g., the client host 104a). The client 820a may be configured to generate memory requests for the client host 104 requests according to a Representational State Transfer (REST)-style network services architecture, a document- or message-based network services architecture, or another suitable network services architecture.

In other embodiments, a client 820a may be configured to provide access to the provider network 802 to other applications in a manner that is transparent to those applications. For example, the client 820a may be configured to integrate with an operating system or file system to provide access to the client host 104 in accordance with a suitable variant of the stream-based shared storage system model described herein. However, the operating system or file system may present a different storage interface to applications, such as a conventional file system hierarchy of files, directories and/or folders. In such an embodiment, applications may not need to be modified to make use of the stream-based shared storage system service models described above. Instead, the details of interfacing to the provider network 802 may be coordinated by the client 820 and the operating system or file system on behalf of applications executing within the operating system environment.

The clients 820a-n may convey web services requests to and receive responses from the provider network 802 via the network 818. In various embodiments, the network 818 may encompass any suitable combination of networking hardware and protocols necessary to establish network-based communications (e.g., web-based communications) between the clients 820a-n and the provider network 802. For example, the network 818 may generally encompass the various telecommunications networks and service providers that collectively implement the Internet. The network 818 may also include private networks such as local area networks (LANs) or wide area networks (WANs) as well as public or private wireless networks. For example, both a given client 820a and the provider network 802 may be respectively provisioned within enterprises having their own internal networks. In such an embodiment, the network 818 may include the hardware (e.g., modems, routers, switches, load balancers, proxy servers, etc.) and software (e.g., protocol stacks, accounting software, firewall/security software, etc.) necessary to establish a networking link between given client 820a and the Internet as well as between the Internet and the provider network 802. It is noted that in some embodiments, the clients 820a-n may communicate with the provider network 802 using a private network rather than the public Internet. For example, the clients 820a-n may be provisioned within the same enterprise as a stream-based shared storage system (e.g., a system that implements the client host 104, the local storage device 106, the stream database 110, and the snapshot database 108). In such a case, the clients 820a-n may communicate with the provider network 802 entirely through a private network (e.g., a LAN or WAN that may use Internet-based communication protocols but which is not publicly accessible).

Generally speaking, the provider network 802 may be configured to implement one or more service endpoints (e.g., the control interface 812, the stream interface 814, the storage manager 816, or another interface) configured to receive and process web services requests, such as input/output requests for a stream-based shared storage system. For example, the provider network 802 may include hardware and/or software configured to implement a particular endpoint, such that an HTTP-based web services request directed to that endpoint is properly received and processed. In one embodiment, the provider network 802 may be implemented as a server system configured to receive web services requests from the clients 820a-n and to forward them to components of the virtual computing service 804 to provide access to the client host 104.

Generally speaking, the virtual computing service 804 may be configured to provide computing resources, such as the virtual machine client 822, to the clients 820a-n. These computing resources may in some embodiments be offered to the clients 820a-n in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. The control interface 812 may be used as an interface between the clients 820a-n and the virtual computing service 804. In some embodiments clients 820a-n or other any other user may be configured (and/or authorized), via the control interface 812, to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client applications, such as the client applications 118*a-n* without, for example, requiring the clients 820*a-n* to access an instance. Compute instance configurations may include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, the provider network 802 may implement components to coordinate implementing the client host 104 within a particular compute instance (e.g., the virtual machine client 822). The client host 104 may operate as described above with reference to FIGS. 1-7 to provide access to a stream-based shared storage system.

Generally speaking, the virtual storage device service 806 may be configured to provide virtual block storage for other computing devices, such as compute instances implemented as part of the virtual computing service 804. A block-based storage service is a storage system, composed of a pool of multiple independent resource hosts (e.g., storage devices), which provide block level storage for storing one or more sets of data volumes. Storage devices may be mapped or physically attached to particular client(s) (e.g., the virtual machine client 822), providing virtual block-based storage (e.g., hard disk storage or other persistent storage) as a contiguous set of logical blocks. For example, the client host 104 may quickly read from the local storage device 106, as described above with reference to FIG. 1. In some embodiments, the local storage device 106 may be physically coupled to one or more computing devices used to implement the virtual machine client 822. In some embodiments, a storage device may be divided up into multiple data chunks or partitions (including one or more data blocks) for performing other block storage operations, such as snapshot operations or replication operations.

Access to storage devices may be provided over an internal network within the provider network 802 or externally via the network 818, in response to one or more requests from the clients 820*a-n*. In some embodiments, the virtual storage device service 806 may not be directly accessible to the clients 820*a-n* and may instead be accessible via one or more virtual machine clients, such as the virtual machine client 822.

Generally speaking, the streaming service 808 may be configured to manage the creation, storage, retrieval, and processing of large-scale data streams designed to handle hundreds or even thousands of concurrent data producers and data consumers are described. The streaming service 808 may provide programmatic interfaces (e.g., application programming interfaces (APIs), web pages or web sites, graphical user interfaces, or command-line tools) to clients (e.g., the clients 820*a-n* or to virtual machine clients such as the virtual machine client 822) to enable the creation, configuration and deletion of streams, as well as the submission, storage and retrieval of stream data records such as the stream database 110 in some embodiments.

In at least some embodiments, the streaming service 808 may be implemented as a multi-tenant managed network-accessible service in a virtualization environment. That is, various physical resources (such as computer servers or hosts, storage devices, networking devices and the like) may at least in some cases be shared among streams of different customers in such embodiments, without necessarily making the customers aware of exactly how the resources are being shared, or even making a customer aware that a given resource is being shared at all. Control components of the managed multi-tenant stream management and/or processing managed services may dynamically add, remove, or reconfigure nodes or resources being used for a particular stream based on various applicable policies, some of which may be client-selectable. In addition, the control components may also be responsible for transparently implementing various types of security protocols (e.g., to ensure that one client's stream application cannot access another client's data, even though at least some hardware or software may be shared by both clients), monitoring resource usage for billing, generating logging information that can be used for auditing or debugging, and so on. From the perspective of clients of the managed multi-tenant service(s) (e.g., the clients 820*a-n* or the virtual machine client 822), the control/administrative functionality implemented by the service(s) may eliminate much of the complexity involved in supporting large-scale streaming applications. In some scenarios, customers of such multi-tenant services may be able to indicate that they do not wish to share resources for at least some types of stream-related operations, in which case some physical resources may be designated at least temporarily as being single-tenant for those types of operations (i.e., limited to operations performed on behalf of a single customer or client).

Generally speaking, the object-redundant data storage service 810 may be configured to receive requests to store data objects on behalf of storage service clients (e.g., the clients 820*a-n* or virtual machine clients such as the virtual machine client 822), and may store those data objects using redundancy in order to provide a high level of durability for the stored data. For example, such a data storage service may replicate the objects it stores across different storage nodes to increase the likelihood that object data will survive the failure of any given storage node. An object may be divided into a number of portions or "shards" according to a redundant encoding scheme (such as a parity, error correction code or other scheme), such that the object data may be recreated from fewer than all of the generated portions. Typically, object-redundant storage systems may be also seek to improve performance characteristics, such as latency, throughput or availability. In the illustrated embodiment, snapshot data and associated metadata may be stored at the snapshot database 108 such that client hosts may be added to the stream-based shared storage system as described above.

Note that while several examples included herein describe portions of the stream-based shared storage system (e.g., the stream database 110) as being exposed to external clients (e.g., the clients 820*a-n*), in other embodiments, the portions of the stream-based shared storage system may be internal to a computing system or an enterprise system and may not be exposed to external clients (e.g., users or client applications). For example, a client may request storage of one or more stream events at the stream database 110, and the request may be forwarded to the client host 104, which may cause the one or more stream events to be stored at the stream database 110. In these examples, a "client" of the provider network 802 may be another application internal to a network-based services platform (such as the virtual computing service 804). In such embodiments, the client may access the virtual machine client 822 over a local or private network, rather than over the Internet.

Figure 9:
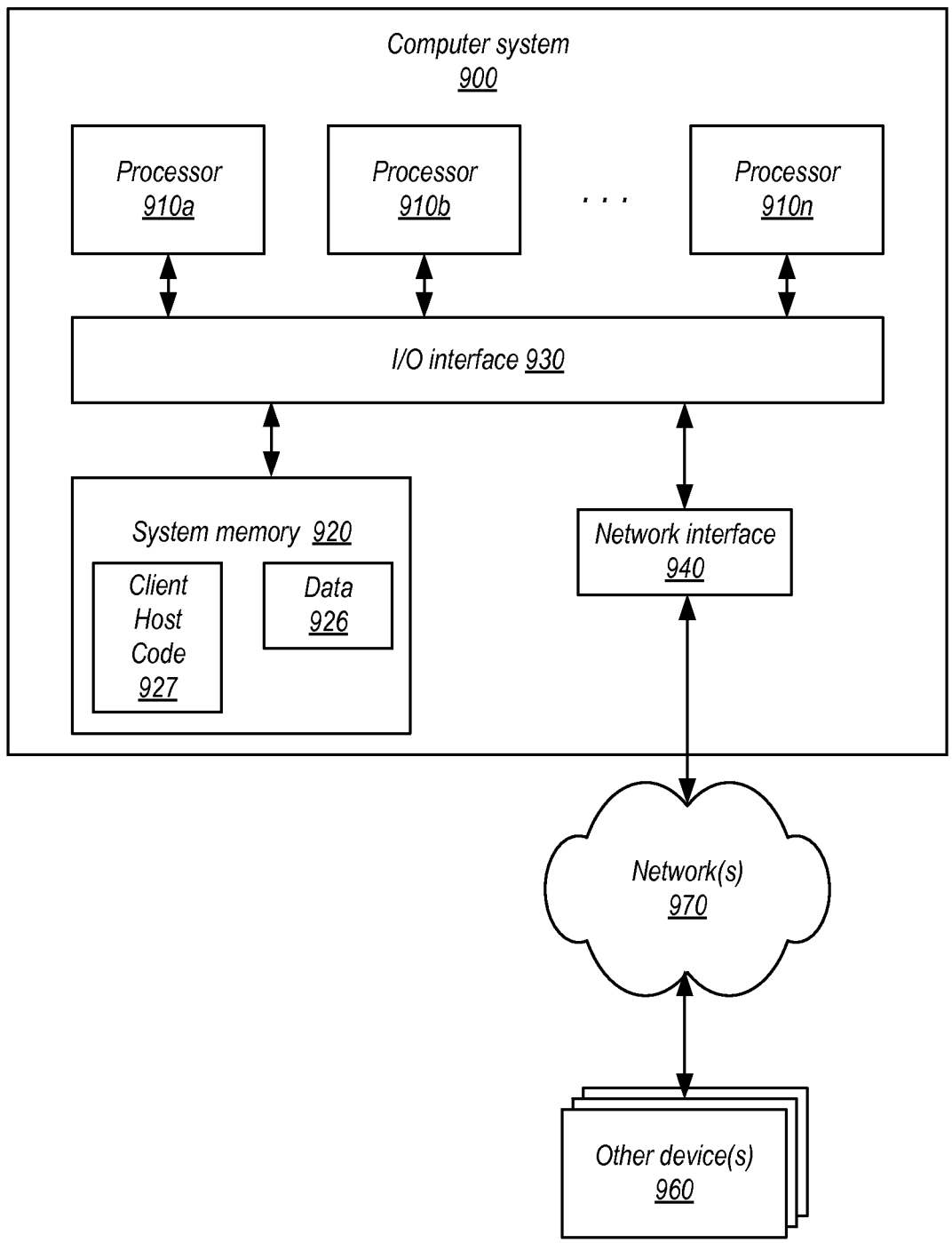
FIG. 9 is a block diagram illustrating one embodiment of a computer system configured to implement at least a portion of a client host, as described herein.

One embodiment of a computer system configured to implement at least a portion of a client host such as the 104a of FIGS. 1 and 2 is shown in FIG. 9. In at least some embodiments, a server that implements a portion or all of the stream-based storage system as described herein may include a general-purpose computer system that includes or is configured to access one or more computer-accessible media, such as a computer system 900 illustrated in FIG. 9. In the illustrated embodiment, the computer system 900 includes one or more processors 910a-n coupled to a system memory 920 via an input/output (I/O) interface 930. The computer system 900 further includes a network interface 940 coupled to the I/O interface 930.

In various embodiments, the computer system 900 may be a uniprocessor system including one processor 910a, or a multiprocessor system including several processors 910a-n (e.g., two, four, eight, or another suitable number). The processors 910a-n may be any suitable processors capable of executing instructions. For example, in various embodiments, the processors 910a-n may be general-purpose or embedded processors implementing any of a variety of instruction set architectures (ISAs), such as the x86, PowerPC, SPARC, or MIPS ISAs, or any other suitable ISA. In multiprocessor systems, each of the processors 910a-n may commonly, but not necessarily, implement the same ISA.

System memory 920 may be configured to store instructions and data accessible by the processor(s) 910. In various embodiments, the system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above regarding the stream-based shared storage system, are shown stored within the system memory 920 as client host code 927 and data 926. For example, the client host code 927 may be used by one or more of the processors 910a-n to implement the client host 104a.

In one embodiment, the I/O interface 930 may be configured to coordinate I/O traffic between a processor 910, the system memory 920, and any peripheral devices in the device, including the network interface 940 or other peripheral interfaces. In some embodiments, the I/O interface 930 may perform any necessary protocol, timing or other data transformations to convert data signals from one component (e.g., the system memory 920) into a format suitable for use by another component (e.g., a processor 910). In some embodiments, the I/O interface 930 may include support for devices attached through various types of peripheral buses, such as a variant of the Peripheral Component Interconnect (PCI) bus standard or the Universal Serial Bus (USB) standard, for example. In some embodiments, the function of the I/O interface 930 may be split into two or more separate components, such as a north bridge and a south bridge, for example. Also, in some embodiments some or all of the functionality of the I/O interface 930, such as an interface to the system memory 920, may be incorporated directly into a processor 910.

The network interface 940 may be configured to allow data to be exchanged between the computer system 900 and other devices 960 attached to a network or networks 970, such as other computer systems or devices as illustrated or described in FIGS. 1 through 8, for example. In various embodiments, the network interface 940 may support communication via any suitable wired or wireless general data networks, such as types of Ethernet network, for example. Additionally, the network interface 940 may support communication via telecommunications/telephony networks such as analog voice networks or digital fiber communications networks, via storage area networks such as Fibre Channel SANs, or via any other suitable type of network and/or protocol.

In some embodiments, the system memory 920 may be one embodiment of a computer-accessible medium configured to store program instructions and data as described above for FIGS. 1 through 8 for implementing embodiments of a stream-based shared storage system. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to the computer system 900 via the I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of the computer system 900 as the system memory 920 or another type of memory. Further, a computer-accessible medium may include transmission media or signals such as electrical, electromagnetic, or digital signals, conveyed via a communication medium such as a network and/or a wireless link, such as may be implemented via the network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
a network-based stream service implemented by one or more hardware processors and one or more storage devices, wherein the network-based stream service is configured to:

receive stream events from client hosts, wherein the stream events correspond to updates to a shared storage of the client hosts from client applications of the client hosts;
maintain the stream events in an order in which the stream events were received; and
provide the stream events in the order to the client hosts as an ordered set of stream events that comprise events from more than one of the client hosts;
local storage devices of the client hosts, wherein the local storage devices are each configured to implement respective instances of the shared storage that maintain a local version of the shared data set; and
the client hosts, wherein a particular client host comprises:
a storage driver configured, in response to receiving a read request from a local client application, to obtain data from a particular one of the local storage devices associated with the particular client host;
a stream writer configured, in response to receiving, from the local client application, a write request for the shared storage, to send data based on the write request from the client application to the network-based stream service as one or more of the stream events; and
an update manager configured to:
receive the ordered set of stream events that comprise the events from more than one of the client hosts in the order from the network-based stream service; and
update data in the local version of the shared storage at the particular local storage device based at least in part on the ordered set of stream events that comprise events from more than one of the client hosts.

2. The system of claim 1, wherein the update manager is configured to receive, as one or more of the ordered set of stream events, the data sent to the network-based stream service by the stream writer.

3. The system of claim 1, wherein, in response to receiving a particular stream event from the network-based stream service, to update the data corresponding to the shared storage at the particular local storage device, the update manager is configured to:
determine whether the particular stream event completes a corresponding shared storage update;
in response to the particular stream event not completing the corresponding shared storage update, buffer the corresponding shared storage update in an ordered list of incomplete shared storage updates; and
in response to the particular stream event completing the corresponding shared storage update, write the completed shared storage update to the particular local storage device.

4. The system of claim 1, wherein the particular client host is not configured to communicate with other client hosts of the client hosts to update the data of the shared storage.

5. The system of claim 4, wherein the particular client host is not configured to communicate with other client hosts of the client hosts.

6. The system of claim 1, wherein the network-based stream service is further configured to:
receive different stream events from different client hosts, wherein the different stream events correspond to different updates to a different shared storage of the client hosts from different clients, wherein the different client hosts includes at least one client host of the client hosts and at least one different client host;
maintain the different stream events in a different order based at least in part on when the different stream events were received; and
provide the different stream events in the different order to the different client hosts as a different ordered set of stream events.

7. A method, comprising:
performing, by one or more computers:
receiving, by a client host of a plurality of client hosts that individually send data to, and receive ordered stream events from, a network-based stream service, a read request from a local client for particular data of a shared storage; and
in response to the read request, obtaining, by the client host, the particular data from a local version of the shared storage stored at a local storage device;
in response to receiving, by the client host from a local client, a write request for a shared storage,
sending, by the client host, data corresponding to the write request to the network-based stream service as one or more stream events for the shared storage;
receiving, by the client host from the network-based stream service, an ordered stream event that is distinct from the data sent to the network-based stream service, for the shared storage ordered according to an order that the network-based stream service received the stream event; and
updating, by the client host based at least in part on the ordered stream event, data stored in the local version of the shared storage at the local storage device.

8. The method of claim 7, further comprising, in response to a snapshot creation instruction:
copying data from the local storage device to a snapshot storage device;
generating metadata associated with the data, wherein the metadata includes a sequence number of a most recently received ordered stream event; and
copying the metadata to the snapshot storage device.

9. The method of claim 8, further comprising, in response to the snapshot creation instruction:
prior to copying the data from the local storage device to the snapshot storage device, suspending local input/output requests; and
after copying the metadata to the snapshot storage device, resuming the local input/output requests.

10. The method of claim 8, wherein the metadata further includes update data corresponding to one or more incomplete updates for the shared storage.

11. The method of claim 8, wherein the snapshot creation instruction is received from the local client.

12. The method of claim 8, wherein the snapshot creation instruction is generated by a processor of the one or more computers.

13. The method of claim 7, further comprising, prior to receiving the read request:
requesting snapshot data and metadata from a snapshot store associated with the network-based stream service;
writing the snapshot data to the local storage device;
identifying a stream service sequence number from the metadata;
requesting, from the network-based stream service, one or more stream events subsequent to the stream service sequence number;

updating the local storage device based at least in part on the one or more stream events subsequent to the stream service sequence number; and allowing local input/output requests at the one or more computers.

14. The method of claim 13, further comprising:

after requesting the snapshot data and the metadata, identifying one or more incomplete updates from the metadata;

buffering the one or more incomplete updates;

after requesting the one or more stream events subsequent to the stream service sequence number, detecting that at least one of the one or more stream events completes a particular update of the one or more incomplete updates; and completing, based at least in part on the at least one of the one or more stream events, the particular update, wherein updating the local storage device is further based at least in part on the particular update.

15. The method of claim 7, further comprising the network-based stream service modifying a number of stream events stored at the network-based stream service based at least in part on a ping to at least one of the one or more computers, a request from at least one of the one or more computers, a number of stream events received at the network-based stream service within a particular amount of time, an anticipated service delay, or any combination thereof.

16. The method of claim 7, further comprising, prior to receiving the ordered stream event, sending a stream event request to the network-based stream service, wherein receiving the ordered stream event comprises receiving a plurality of ordered stream events in response to the stream event request.

17. The method of claim 7, wherein the write request modifies the particular data requested by the read request, wherein the write request is received prior to the read request, and wherein obtaining the particular data from the local storage device comprises:

detecting that at least a portion of the one or more stream events have not been received from the network-based stream service; and delaying a read of the local storage device until the one or more stream events have been received from the network-based stream service.

18. A non-transitory, computer-readable storage medium storing program instructions that, when executed on one or more computers, cause the one or more computers to:

implement a client host configured to:

receive a read request from a local client for particular data of a shared storage; and in response to the read request, obtain the particular data from a local version of the shared storage stored at the local storage device;

in response to receipt, from a local client, of a write request for a shared storage, send data corresponding to the write request to a network-based stream service as one or more stream events for the shared storage, wherein the network-based stream service receives data from, and sends ordered stream events to, individual ones of a plurality of client hosts comprising the client host;

receive, from the network-based stream service, an ordered stream event that is distinct from the data sent to the network-based stream service, for the shared storage ordered according to an order that the network-based stream service received the stream event; and update, based at least in part on the ordered stream event, data stored in the local version of the shared storage at the local storage device.

19. The non-transitory, computer-readable storage medium of claim 18, wherein the client host is not configured to communicate with other clients of a plurality of client hosts associated with the shared storage.

20. The non-transitory, computer-readable storage medium of claim 18, wherein the client host is further configured, in response to the write request and prior to sending the data corresponding to the write request to the network-based stream service, to:

determine whether a memory location addressed by the write request is addressed by an incomplete update of a list of incomplete updates;

in response to determining that the memory location is addressed by the incomplete update, determine whether the incomplete update corresponds to the local client; and in response to determining that the incomplete update does not correspond to the local client, prevent data corresponding to the write request from being sent to the network-based stream service.

21. The non-transitory, computer-readable storage medium of claim 18, wherein the client host is further configured to ignore one or more ordered stream events that address one or more memory locations addressed by one or more incomplete updates of a list of incomplete updates.

22. The non-transitory, computer-readable storage medium of claim 21, wherein the client host is further configured, in response to detecting that the one or more ordered stream events correspond to a local client of the client host, to notify the local client of a write failure corresponding to the one or more ordered stream events.

23. The non-transitory, computer-readable storage medium of claim 18, wherein, to update the data stored at the local storage device, the client host is configured to communicate with the local storage device across a network connection.

* * * * *